United States Patent
Winger

(10) Patent No.: US 7,944,968 B2
(45) Date of Patent: May 17, 2011

(54) METHOD FOR SPECIFICATION OF QUANTIZED COEFFICIENT LIMIT

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1562 days.

(21) Appl. No.: 11/104,069

(22) Filed: Apr. 12, 2005

(65) Prior Publication Data

US 2006/0227866 A1   Oct. 12, 2006

(51) Int. Cl.
*H04N 7/12* (2006.01)
*G06K 9/36* (2006.01)

(52) U.S. Cl. .................... 375/240.03; 382/251

(58) Field of Classification Search ............ 348/384, 348/385, 388, 390, 420; 382/232, 233, 246, 382/250, 251, 254, 276, 215; 375/240.03, 375/240.12, 341, 240.23, 240.18, 240.24
See application file for complete search history.

(56) References Cited

U.S. PATENT DOCUMENTS

| | | | |
|---|---|---|---|
| 5,870,497 A * | 2/1999 | Galbi et al. ................ | 382/232 |
| 6,167,084 A * | 12/2000 | Wang et al. .............. | 375/240.02 |
| 7,327,786 B2 * | 2/2008 | Winger et al. ........... | 375/240.12 |
| 7,373,009 B2 * | 5/2008 | Winger ..................... | 382/251 |
| 7,418,147 B2 * | 8/2008 | Kamaci et al. ............ | 382/251 |
| 2005/0249291 A1 * | 11/2005 | Gordon et al. ........... | 375/240.18 |
| 2005/0259729 A1 * | 11/2005 | Sun .......................... | 375/240.1 |
| 2006/0002479 A1 * | 1/2006 | Fernandes ................ | 375/240.25 |

OTHER PUBLICATIONS

Wien, M., Variable block-size transforms for H.264/AVC, IEEE,604-613.*

* cited by examiner

*Primary Examiner* — Behrooz Senfi
(74) *Attorney, Agent, or Firm* — Christopher P. Maiorana, PC

(57) ABSTRACT

An apparatus including a transformation circuit and a scaling/quantization circuit. The transformation circuit may be configured to generate one or more transform coefficients in response to a video stream and one or more first control signals. The transformation circuit may be further configured to limit transform coefficients for residual 4×4 blocks to a 16-bit value when the video stream comprises 8-bit video data. The scaling/quantization circuit may be configured to generate one or more quantization coefficients in response to the one or more transform coefficients and one or more second control signals.

18 Claims, 5 Drawing Sheets

200 ↴

202
RECEIVE 8-BIT VIDEO FOR H.264-AVC HIGH PROFILE COMPLIANT COMPRESSION

204
PERFORM TRANSFORMATION OPERATION

206
LIMIT TRANSFORM COEFFICIENT VALUES (E.G., RESIDUAL 4X4 BLOCK COEFFICIENTS) TO 16 BITS

208
PERFORM SCALING AND QUANTIZATION OPERATIONS

210
ENCODE QUANTIZED COEFFICIENTS IN COMPRESSED BIT STREAM (E.G., ENTROPY ENCODING).

252
H264-AVC "COMPLIANT BIT STREAM" IN ACCORDANCE WITH THE PRESENT INVENTION (E.G., NO 4x4 RESIDUAL COEFFICIENTS GREATER THAN 16-BITS FOR 8-BIT VIDEO.

254
COEFFICIENT RECONSTRUCTION PROCESS (E.G., ENTROPY DECODING AND INVERSE QUANTIZATION).

256
16-BIT DATAPATH AND/OR STORAGE FOR COEFFICIENT VALUES, USE OF SINGLE WORD 16-BIT DMA TRANSFERS WITH ONE 16-BIT WORD PER COEFFICIENT, ETC.

258
VIDEO RECONSTRUCTION PROCESS (E.G., INVERSE ZIGZAG, INVERSE TRANSFORM, ETC.)

260
PRESENT VIDEO AT AN OUTPUT (E.G., FOR A DECODER) AND/OR AT AN INPUT TO A VIDEO ENCODING PROCESS (E.G., FOR A TRANSCODER).

METHOD FOR SPECIFICATION OF QUANTIZED COEFFICIENT LIMIT

FIELD OF THE INVENTION

The present invention relates to video compression generally and, more particularly, to a method for specification of quantized coefficient limit.

BACKGROUND OF THE INVENTION

ITU-T Recommendation H.264|ISO/IEC 14496-10 Advanced Video Coding Amendment 1: Fidelity Range Extensions (MPEG4-AVC FRExt, Joint Video Team (JVT) draft JVT-L050d4) is a significant proposed enhancement of the original ITU-T Recommendation H.264 & ISO/IEC 14496-10 "Advanced Video Coding" video coding standard. One of the most significant extensions, highlighted in the title of the amendment, is the increased video fidelity that is enabled with an increased range of coded transform coefficients. The FRExt 8-bit video "High Profile" extension is rapidly being provisionally adopted by DVB, DVD-Forum, Blu-ray, ATSC, and other such application standards bodies for such markets as HD-DVD players/recorders/content-distribution, set-top boxes, personal video recorders (PVRs), etc.

One significant drawback of the draft standard is that a bit stream containing 17-bit quantized coefficients is compliant with the standard when 8-bit video is represented (e.g., with the High Profile (HP) extension). The disadvantage is that HP compliant decoders (and in particular HP decoders implemented on 16-bit DSPs) must be capable of processing 17-bit coefficients. The ability to process 17-bit coefficients is a significant burden for HP compliant decoders, particularly for architectures relying on 16-bit components (e.g., acceleration on Intel® platforms using MMX™ instructions) for consumer applications. In general, the vast majority of consumer applications use 8-bit video.

Decoders must be designed to operate with worst-case bit streams to be considered standard compliant. Therefore, if (with a particular architecture) being fully compliant is not possible at reasonable cost, many decoders may choose to be partially compliant (e.g., be able to compliantly decode 8-bit video streams containing only 16-bit coefficients), or be able to display 'reasonable' although non-compliant output for video streams containing 17-bit coefficients (e.g., (i) drop frames if 17-bit coefficients require too many processing cycles, (ii) approximate the output by approximating 17-bit coefficients with 16-bit coefficients, (iii) output corrupted and/or drifting output when 17-bit coefficients are encountered, (iv) be able to compliantly decode 17-bit coefficients for luma and/or chroma only and (v) variations on the above. However, non-compliant decoders can suffer various market acceptance and licensing risks that are not present for compliant decoders. Decoders capable of decoding worst-case bit streams containing 17-bit coefficients can suffer substantial cost premiums over decoding hardware and software that cannot compliantly decode such bitstreams.

The JVT-L050d4 draft FRExt specification method for imposing limitations on bit streams cannot prevent compliant streams from containing 17-bit coefficients for 8-bit video. The FRExt standard specified range limits on the outputs of inverse transform butterfly stages and coefficient scaling operations (as used by both the draft FRExt standard and the original non-amended standard) are insufficient to indirectly limit all coefficients to 16-bits for 8-bit video data in High Profile format.

It would be desirable to have a method for specification of a quantized coefficient limit.

SUMMARY OF THE INVENTION

The present invention concerns an apparatus including a transformation circuit and a scaling/quantization circuit. The transformation circuit may be configured to generate one or more transform coefficients in response to a video stream and one or more first control signals. The transformation circuit may be further configured to limit transform coefficients for residual 4×4 blocks to a 16-bit value when the video stream comprises 8-bit video data. The scaling/quantization circuit may be configured to generate one or more quantization coefficients in response to the one or more transform coefficients and one or more second control signals.

The objects, features and advantages of the present invention include providing a method for specification of quantized coefficient limit that may (i) be more effective than other alternatives, (ii) guarantee that 17-bit coefficients are not possible in compliant FRExt "High Profile" streams, (iii) take advantage of 16-bit coefficient storage, transfer, and instructions for coefficients, (iv) provide a more efficient and cost effective decoder than prior standard compliant decoders and/or (v) be implemented as part of the H.264 FRExt standard.

BRIEF DESCRIPTION OF THE DRAWINGS

These and other objects, features and advantages of the present invention will be apparent from the following detailed description and the appended claims and drawings in which:

FIG. 4 is a flow diagram illustrating an encoding process in accordance with a preferred embodiment of the present invention; and FIG. 5 is a flow diagram illustrating a decoding process in accordance with a preferred embodiment of the present invention.

DETAILED DESCRIPTION OF THE PREFERRED EMBODIMENTS

Figure 1:
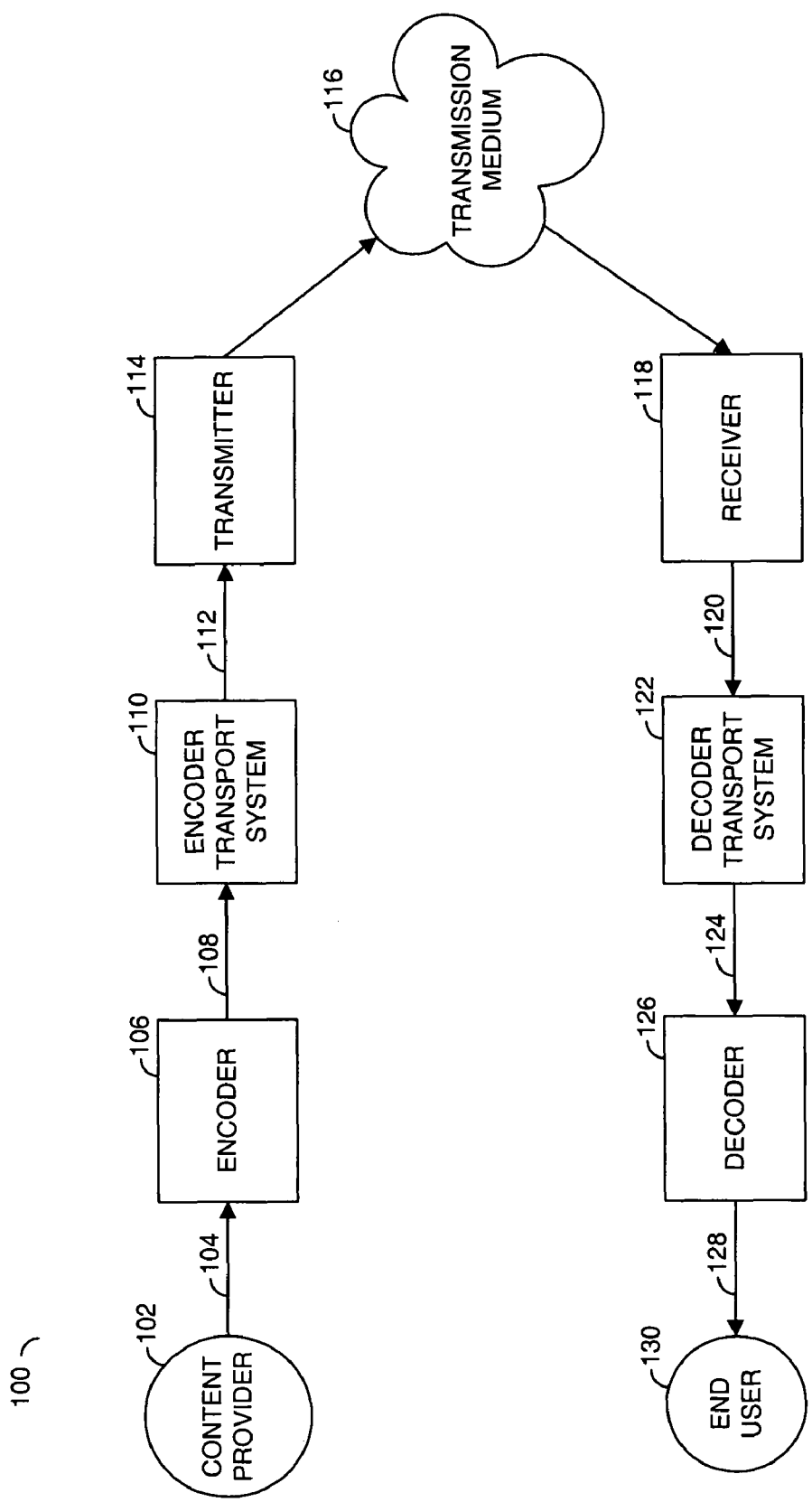
FIG. 1 is a block diagram illustrating various components of a compressed video system in accordance with a preferred embodiment of the present invention.

Referring to FIG. 1, a block diagram of a system 100 is shown illustrating components of a compressed video system in accordance with a preferred embodiment of the present invention. In general, a content provider 102 presents video image, audio or other data to be compressed and transmitted in a data stream 104 to an input of an encoder 106. The encoder 106 may be configured to generate a compressed bit stream 108 in response to the input stream 104. In one example, the encoder 106 may be configured to encode the data stream 104 according to one or more encoding standards including H.264 (MPEG-4 part 10) AVC FRExt. The encoder 106 may be further configured to generate the bit stream 108 using a quantization process implemented with a specification of coefficient limit in accordance with the present invention.

The compressed bit stream 108 from the encoder 106 may be presented to an encoder transport system 110. An output of the encoder transport system 110 generally presents a signal 112 to a transmitter 114. The transmitter 114 transmits the compressed data via a transmission medium 116. In one example, the content provider 102 may comprise a video broadcast, DVD, or any other source of video data stream. The transmission medium 116 may comprise, for example, a broadcast, cable, satellite, network, DVD, hard drive, or any other medium implemented to carry, transfer, and/or store a compressed bit stream. In one example, the encoder 106, encoder transport 110 and transmitter 114 may be implemented as part of a video recorder/player apparatus.

On a receiving side of the system 100, a receiver 118 generally receives the compressed data bit stream from the transmission medium 116. The receiver 118 presents an encoded bit stream 120 to a decoder transport system 122. The decoder transport system 122 generally presents the encoded bit stream via a link 124 to a decoder 126. The decoder 126 generally decompresses (or decodes) the data bit stream and presents the data via a link 128 to an end user hardware block (or circuit) 130. The end user hardware block 130 may comprise a television, a monitor, a computer, a projector, a hard drive, a personal video recorder (PVR), an optical disk recorder (e.g., DVD), or any other medium implemented to carry, transfer, present, display and/or store the uncompressed bit stream (e.g., decoded video signal). In one example, the receiver 118, decoder transport 122 and decoder 126 may be implemented as part of a video recorder/player apparatus.

Figure 2:
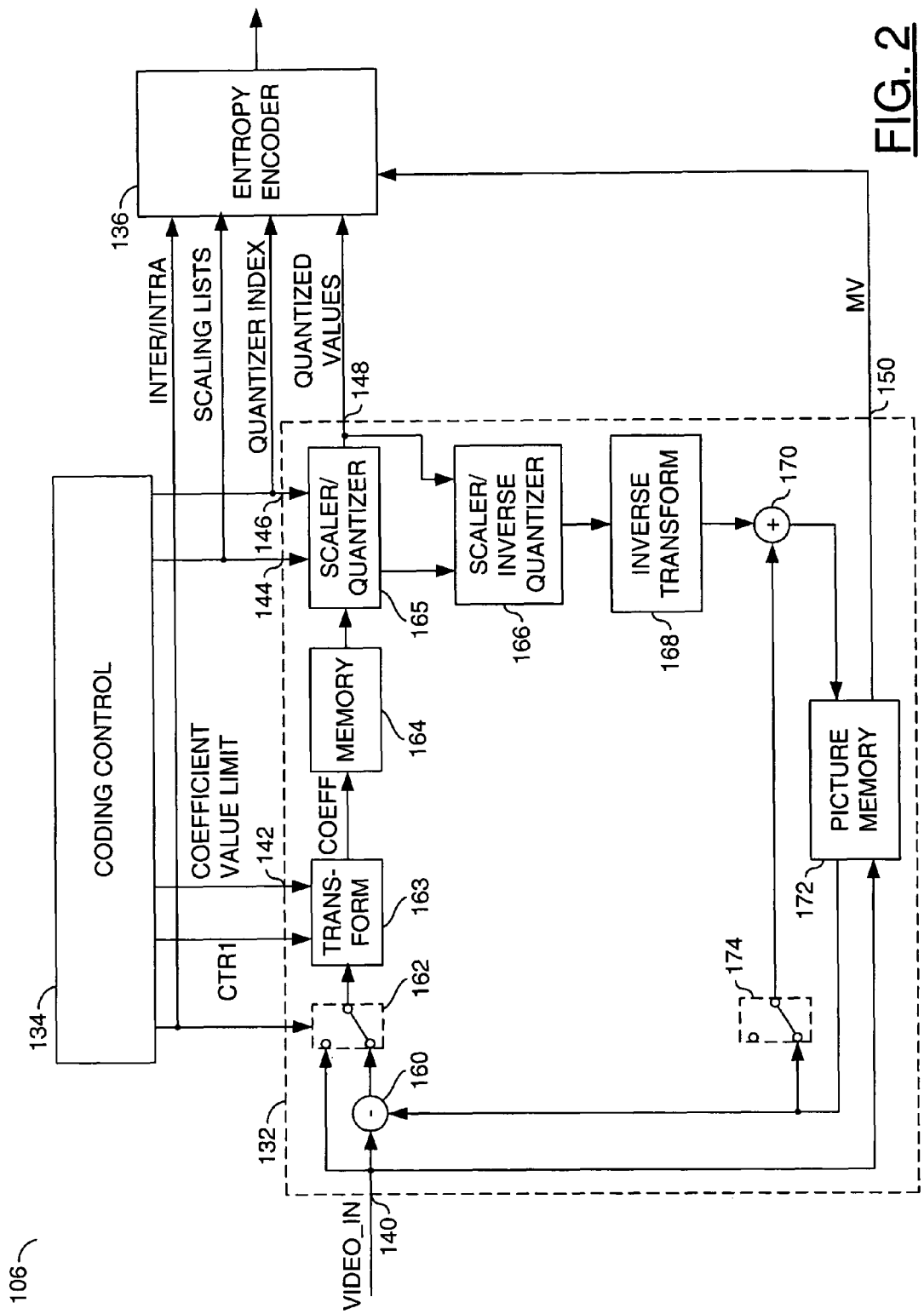
FIG. 2 is a more detailed block diagram illustrating a video encoder/decoder (CODEC) in accordance with a preferred embodiment of the present invention.

Referring to FIG. 2, a more detailed block diagram of the circuit 106 of FIG. 1 is shown illustrating an example encoder in accordance with a preferred embodiment of the present invention. The circuit 106 may be implemented, in one example, as a video encoder. In one example, the circuit 106 may be compliant with ITU-T Revised Rec. H.264(E):2005 "Advanced video coding for generic audio visual services," Feb. 28, 2005 (for ITU) and ISO/IEC 14496-10:2004, ISO/IED 14496-10: 2004/AMD1 and ISO/IED 14496-10:2001/DCOR1 (for MPEG), each of which is hereby incorporated by reference in its entirety. The circuit 106 may also be compliant with one or more other compression standards or methods (e.g., H.264, VC1, and/or other specifications). The present invention generally provides encoding rules for specification of a coefficient value limit. The circuit 106 may comprise a circuit (or block) 132, a circuit (or block) 134 and a circuit (or block) 136. The block 132 may be implemented, in one example, as an encoder/decoder (CODEC) circuit. The block 134 may be implemented as a coding control circuit. The block 136 may be implemented as an entropy coding block.

The circuit 132 may have an input 140 that may receive a signal (e.g., VIDEO_IN), an input 142 that may receive a signal (e.g., COEFFICIENT VALUE LIMIT), an input 144 that may receive a signal (e.g., SCALING LISTS), an input 146 that may receive a signal (e.g., QUANTIZER INDEX), an output 148 that may present a signal (e.g., QUANTIZED VALUES) and an output 150 that may present a signal (e.g., MV). The signal VIDEO_IN may comprise a video bit stream. In one example, the signal VIDEO_IN may be implemented as an 8-bit video data stream. The signal SCALING LISTS may comprise values for one or more quantization matrices. In one example, the signal SCALING LISTS may be omitted when default quantization matrices are used. The signal COEFFICIENT VALUE LIMIT may be configured to specify a maximum number of bits for transform (or residual) coefficients. In one example, the signal COEFFICIENT VALUE LIMIT may specify a maximum bitdepth for residual 4×4 block coefficients. The signal QUANTIZED VALUES may comprise a number of quantized values generated from the transform coefficients. The signal MV may comprise a number of motion vectors. The block 132 may be configured to generate the signal QUANTIZED VALUES and the signal MV in response to the signal VIDEO_IN, the signal SCALING LISTS, the signal COEFFICIENT VALUE LIMIT, the signal QUANTIZER INDEX and one or more control signals (e.g., CTR1 and INTER/INTRA) received from the block 134. In general, the block 132 may be implemented using conventional techniques modified in accordance with the present invention.

The circuit 134 may have a first output that may present the signal INTER/INTRA, a second output that may present the control signal CTR1, a third output that may present the signal COEFFICIENT VALUE LIMIT, a fourth output that may present the signal SCALING LISTS and a fifth output that may present the signal QUANTIZER INDEX. The signal INTER/INTRA may be implemented, in one example, as a decision flag. The signal CTR1 may be configured, in one example, to control a transformation process of the block 132. For example, the signal CTR1 may be configured to select between 8×8 and 4×4 transforms. The circuit 134 may be configured, in one example, to generate the signals CTR1 and INTER/INTRA according to conventional techniques. The circuit 134 may be further configured to generate the signal COEFFICIENT VALUE LIMIT in accordance with the present invention.

The block 136 may be implemented using conventional techniques. In one example, the block 136 may be configured to generate a compressed bit stream using one or more of variable length codes (VLC), context-adaptive variable length coding (CAVLC) and/or context-adaptive binary arithmetic coding (CABAC). The block 136 may be configured to generate the compressed bit stream in response to the signals INTER/INTRA, SCALING LISTS, QUANTIZER INDEX, QUANTIZED VALUES and MV.

In one example, the circuit 132 may comprise a block (or circuit) 160, a block (or circuit) 162, a block (or circuit) 163, a block (or circuit) 164, a block (or circuit) 165, a block (or circuit) 166, a block (or circuit) 168, a block (or circuit) 170, a block (or circuit) 172 and a block (or circuit) 174. The block 160 may be implemented as a subtractor (or difference) circuit. The block 162 may be implemented as a multiplexer (or selector) circuit. The block 163 may be implemented as a transform block. The block 164 may be implemented as a 16-bit memory. The block 165 may be implemented as a scaler/quantizer block. The block 166 may be implemented as a scaler/inverse quantizer block. The block 168 may be implemented as an inverse transform block. The block 170 may be implemented as an adder. The block 172 may be implemented as a picture memory. The block 174 may be implemented as a multiplexer (or selector) circuit. Other blocks or circuits may be implemented accordingly to meet the design criteria of a particular implementation. In one example, the block 172 may also comprise a video sample reconstruction block, a motion estimation block, a motion compensation block, and a filter block, as would be recognized by a person of ordinary skill in the field of the present invention.

The signal VIDEO_IN may be presented to a first input of the block 160 and a first input of the block 162. An output of the block 160 may present a signal to a second input of the block 162. The block 162 may be configured to couple either the first input or the second input to an output in response to the signal INTER/INTRA. The output of the block 162 may be presented to an input of the block 163. The block 163 may be configured (i) to transform the signal received from the block 162 based upon the signal CTR1 and (ii) to limit a bitdepth of transform coefficients based upon the signal COEFFICIENT VALUE LIMIT. For example, the circuit 163 may be configured to limit values in a signal (e.g., COEFF) to sixteen bits when the signal VIDEO_IN comprises an 8-bit High Profile video stream. An output of the block 163 may present the signal COEFF to an input of the block 164 (e.g., via a 16-bit datapath). In one example, the block 164 may be configured to store 16-bit coefficients for H.264.

The circuit 165 may have a first input that may receive the signal COEFF via the circuit 164, a second input that may receive the signal SCALING LISTS, a third input that may receive the signal QUANTIZER INDEX and an output that may present the signal QUANTIZED VALUES. The signals SCALING LISTS and QUANTIZER INDEX may be configured to signal (or set) values of one or more scaling matrices of the circuit 165. The circuit 165 may be configured to generate the signal QUANTIZED VALUES in response to the signal COEFF, the signal SCALING LISTS and the signal QUANTIZER INDEX.

In one example, the memory 164 may be implemented separately from the blocks 163 and 165. In another example, the 16-bit transform coefficients may be stored (e.g., temporarily) internally to the blocks 163 and 165. When the transform coefficients are stored internally to the blocks 163 and 165, the memory 164 may be omitted depending on the architecture of the encoder and the structure of the internal storage implemented in the blocks 163 and 165.

The block 166 may have a first input that may receive the signal QUANTIZED VALUES and a second input that may receive the signal SCALING LISTS. An output of the block 166 may be presented to an input of the block 168. An output of the block 168 may be presented to a first input of the block 170. An output of the block 170 may be presented to a first input of the block 172. The block 172 may have a first output that may present the signal MV, a second input that may receive the signal VIDEO_IN and a second output that may present a signal to a second input of the block 160 and a first input of the block 174. An output of the block 174 may be presented to a second input of the block 170. The blocks 160, 162 and 165-174 may be implemented using conventional techniques for block-based video encoders. Motion estimation and compensation may be implemented with conventional techniques. However, the implementation of motion estimation and compensation may vary substantially from one encoder to another encoder to meet the design criteria of a particular implementation.

Video compression standards (e.g., MPEG2, MPEG4, H.264, VC1, etc.) generally define a video decoder syntax and decoding process. As part of the decoding process, inverse quantization is generally defined in the standard. However, video encoding implementation is generally more flexible. For example, different encoders may implement forward quantization rules differently. Quantization as used herein generally refers to the process of assigning a range of coefficient levels to a predetermined reconstructed level that may be obtained from a quantization parameter.

Figure 3:
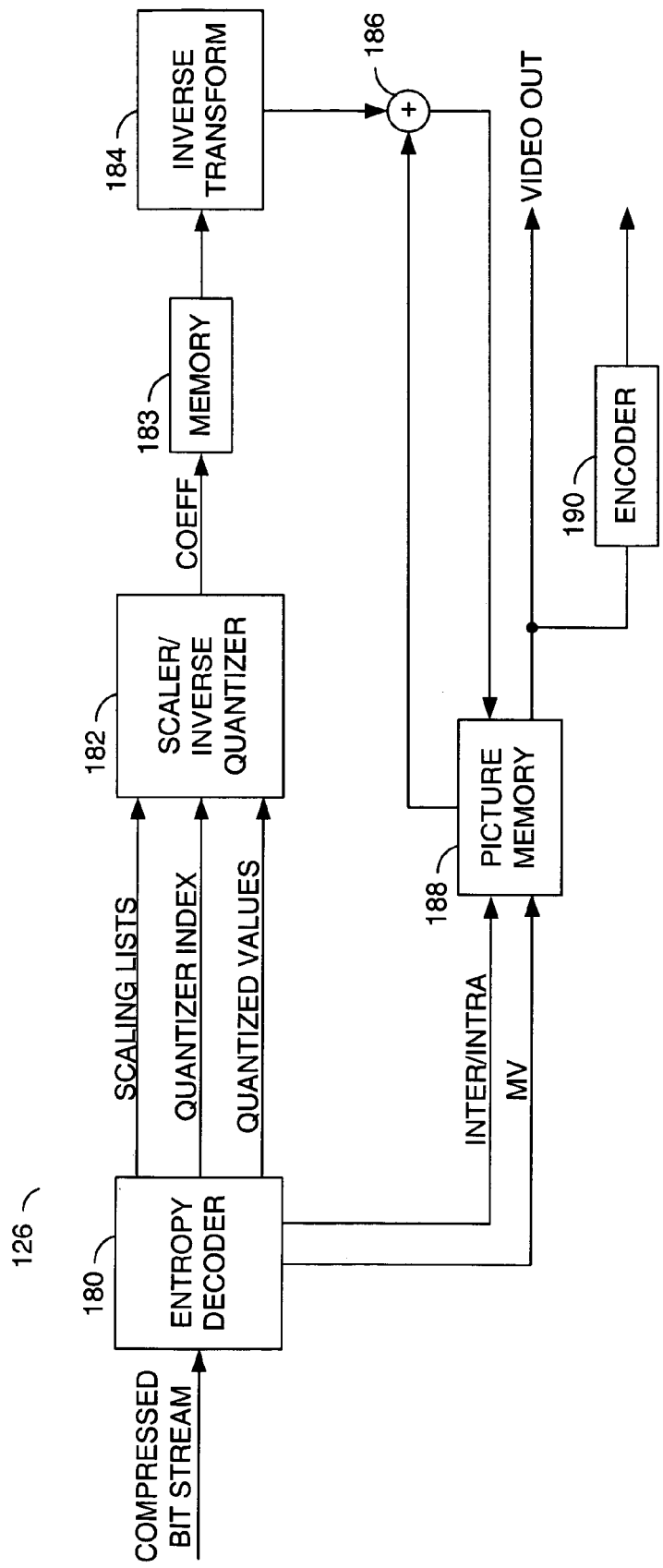
FIG. 3 is a more detailed block diagram illustrating a video decoder in accordance with a preferred embodiment of the present invention.

Referring to FIG. 3, a more detailed block diagram of the circuit 126 of FIG. 1 is shown illustrating an example decoder in accordance with a preferred embodiment of the present invention. The circuit 126 may be implemented, in one example, as a video decoder. The circuit 126 may be implemented as part of a DVD player, personal video recorder (PVR) or other device configured to playback a compressed video bit stream. In one example, the circuit 126 may be compliant with ITU-T Revised Rec. H.264(E):2005 "Advanced video coding for generic audio visual services," Feb. 28, 2005 (for ITU) and ISO/IEC 14496-10:2004, ISO/IED 14496-10:2004/AMD1 and ISO/IED 14496-10:2001/DCOR1 (for MPEG). The circuit 126 may also be compliant with one or more other compression standards or methods (e.g., H.264, VC1, and/or other specifications).

In one example, the decoder 126 may be implemented similarly to the encoder 106, but operate in reverse, as would be recognized by a person of ordinary skill in the art. In one example, the circuit 126 may comprise a circuit (or block) 180, a circuit (or block) 182, a circuit (or block) 183, a circuit (or block) 184, a circuit (or block) 186 and a circuit (or block) 188. The block 180 may be implemented as an entropy decoder block. The block 182 may be implemented as a scaler and inverse quantizer block. The block 183 may be implemented as a memory block configured to store 16-bit coefficients. The block 184 may be implemented as an inverse transform block. The block 186 may be implemented as an adder block. The block 188 may be implemented as a picture memory. In one example, the block 188 may be configured to implement motion compensation in response to information (e.g., motion vectors, etc.) recovered from the compressed bit stream.

When the circuit 126 is implemented as a transcoder, a circuit (or block) 190 may be configured to receive the signal VIDEO OUT. The circuit 190 may be implemented as an encoder circuit. The blocks 180-190 may be implemented using conventional techniques modified in accordance with the teachings of the present invention. In one example, the blocks 182-188 may be implemented similarly to the corresponding blocks (or processing elements) 166-172 of FIG. 2.

The circuit 180 may be configured to recover the signals QUANTIZED VALUES, QUANTIZER INDEX, SCALING LISTS, INTER/INTRA and MV from a compressed bit stream generated in accordance with the present invention. The circuit 180 may have an input that may receive the compressed bit stream, a first output that may present the signal SCALING LISTS, a second output that may present the signal QUANTIZER INDEX, a third output that may present the signal QUANTIZED VALUES, a fourth output that may present the signal INTER/INTRA and a fifth output that may present the signal MV.

The circuit 182 may be configured to generate (or recover) coefficients (e.g., the signal COEFF) in response to one or more of the signals SCALING LISTS, QUANTIZER INDEX, and QUANTIZED VALUES. In one example, the circuit 180 and/or the circuit 182 may be configured to determined whether the signal QUANTIZED VALUES contains coefficients having a bit width greater than sixteen bits. In another example, a bit stream syntax checker block (not shown) may be implemented between the block 180 and the block 182. An output of the block 182 may present the recovered signal COEFF to an input of the block 183 (e.g., via a 16-bit datapath). In one example, the block 183 may be configured to store 16-bit coefficients for H.264.

In one example, the block 183 may be implemented separately from the blocks 182 and 184. In another example, the 16-bit transform coefficients may be stored (e.g., temporarily) internally to the blocks 182 and 184. When the transform coefficients are stored internally to the blocks 182 and 184, the block 183 may be omitted depending on the architecture of the encoder and the structure of the internal storage implemented in the blocks 182 and 184.

The circuit 184 may have an input that may receive the signal COEFF (e.g., via the block 183) and an output that may present a signal to a first input of the circuit 186. The circuit 186 may have an output that may present a signal to a first input of the block 188. The block 188 may have a second input that may receive the signal INTER/INTRA, a third input that may receive the signal MV, a first output that may present a signal to a second input of the circuit 186 and a second output that may present a signal (e.g., VIDEO OUT). In one example, the signal VIDEO OUT may be presented to an input of the block 190. The block 190 may be configured to encode the signal VIDEO OUT.

Referring to FIG. 4, a flow diagram is shown illustrating an example encoding process 200 in accordance with a preferred embodiment of the present invention. The process 200 may begin by receiving 8-bit video data for compression in compliance with the High Profile of the H.264-AVC FRExt standard (e.g., block 202). The video data may be transformed (e.g., using 8×8 or 4×4 transformation processes) to generate transform coefficient values (e.g., block 204). The transform coefficient values may be limited to sixteen bits (e.g., block 206). Once the transform coefficients are limited to sixteen bits, the transform coefficients may be scaled and quantized (e.g., block 208) using conventional techniques. The quantized coefficients may be encoded as a compressed bit stream for transmission or storage (e.g., block 210).

Referring to FIG. 5, a flow diagram is shown illustrating an example decoding process 250 in accordance with the present invention. The process 250 may begin by receiving a H.264-AVC compliant bit stream containing no coefficients greater than 16-bits for 8-bit video data (e.g., block 252). The bit stream may be decoded (e.g., entropy decoding, inverse quantization, etc.) to recover (or reconstruct) coefficients representing the 8-bit video (e.g., block 254). The reconstruction process may differ from a conventional decoding process since 17-bit coefficients are not generally supported.

In one example, the reconstructed coefficients may be communicated to a video reconstruction process via a 16-bit datapath (e.g., block 256). In another example, the reconstructed coefficients may be stored in a 16-bit storage device (or memory). In one example, single word 16-bit direct memory access (DMA) transfers with one 16-bit word per coefficient may be implemented. Other 16-bit optimized data handling may be implemented (e.g., 16-bit instructions for processing data). The reconstructed coefficients may be passed to a video reconstruction process (e.g., block 258).

The video reconstruction process may be implemented with conventional techniques (e.g., inverse zig-zag scan, inverse transformation, etc.). The reconstructed video may be directed based upon the application (e.g., block 260). For example, the reconstructed video may be presented at an output (e.g., for a decoder application) or to an input of a video encoding process (e.g., for a transcoding application).

In general, numerous methods may be implemented to impose a limit of at most eight bits plus the bitdepth of the video sample (e.g., (videoSample)bitdepth+8 bits) on FRExt coefficients. A number of such methods are described in a co-pending U.S. patent application Ser. No. 11/104,070, filed concurrently, which is incorporated herein by reference in its entirety. The present invention generally provides for explicitly limiting the residual 4×4 block coefficients. The explicit limitation on the coefficients may be implemented in addition to limitations imposed upon the outputs of the inverse transform butterfly stages and the output of the coefficient scaling operations. The present invention may be implemented, in one example, by the addition of standard limit specification statements similar to the following:

The bitstream shall not contain data that results in any element cij of c with i,j=0.0 . . . 3 that exceeds the range of integer values from $-2^{(7+bitDepth)}$ to $2^{(7+bitDepth)}-1$, inclusive.

For example, the specification of a quantization coefficient limit may be added in draft JVT-L050d4, subsection 8.5.10 "Scaling and transformation process for residual 4×4 blocks" and in draft JVT-L047d11, subsection 8.5.8 "Scaling and transformation process for residual 4×4 blocks" as follows (where quoted text indicates the explicit specification of a limit on quantization coefficients for conformant bitstreams, and ellipses ( . . . ) indicate intervening text):

. . .

Otherwise (qpprime_y_zero_transform_bypass_flag is equal to 0 or QP'Y is not equal to 0), the following text of this process specifies the output.

. . .

"The bitstream shall not contain data that results in any element cij of c with i,j=0.0 . . . 3 that exceeds the range of integer values from $-2^{(7+bitDepth)}$ to $2^{(7+bitDepth)}-1$, inclusive."

. . . .

In another example, the specification of a quantization coefficient limit may also be added in draft JVT-L050d4, subsection 8.5.11 "Scaling and transformation process for residual 8×8 luma blocks" and in draft JVT-L047d11, subsection 8.5.8a "Scaling and transformation process for residual 8×8 luma blocks":

. . .

Otherwise (qpprime_y_zero_transform_bypass_flag is equal to 0 or QP'Y is not equal to 0), the following text of this process specifies the output.

. . .

"The bitstream shall not contain data that results in any element cij of c with i,j=0.0 . . . 7 that exceeds the range of integer values from $-2^{(7+bitDepth)}$ to $2^{(7+bitDepth)}-1$, inclusive."

. . . .

In general, the present invention may completely prevent 17-bit coefficients for the "High Profile" of FRExt (which is limited to 8-bit video data) by the addition of the specification of quantization coefficient limit in draft JVT-L050d4, subsection 8.5.10 and in draft JVT-L047d11, subsection 8.5.8. However, for symmetry of the text, the addition of the specification of quantization coefficient limit in draft JVT-L050d4, subsection 8.5.11 and in draft JVT-L047d11, subsection 8.5.8a may also be desirable. The present invention generally enables the unique construction of a FRExt compliant decoder using 16-bit storage and 16-bit transfer for coefficient data, as well as 16-bit instructions for the construction of the coefficients.

In general, the solution provided by the present invention may be more effective than other alternative and less direct means for guaranteeing that 17-bit coefficients are not possible in compliant FRExt "High Profile" streams. A standard compliant decoder implemented in accordance with the present invention may take advantage of 16-bit coefficient storage, transfer, and instructions for coefficients. A standard compliant decoder implemented in accordance with the present invention may be much more efficient and cost effective than prior standard compliant decoders, which support 17-bits.

The function performed by the present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of application specific integrated circuits (ASICs), application specific standard products (ASSPs), field programmable gate arrays (FPGAs), or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a transformation circuit configured to generate one or more transform coefficients in response to a video stream and one or more first control signals, wherein said transformation circuit is further configured to limit transform coefficients for residual 4×4 blocks to a 16-bit value when said video stream comprises 8-bit video data;
a scaling/quantization circuit configured to generate one or more quantization coefficients in response to said one or more transform coefficients and one or more second control signals; and
an encoding circuit configured to generate a H.264-AVC FRExt High Profile compliant compressed bit stream in response to said one or more quantization coefficients, wherein a specification of the H.264-AVC FRExt High Profile includes language explicitly limiting the residual 4×4 block coefficients to 16-bit values for 8-bit video.

2. The apparatus according to claim 1, further comprising:
a control circuit configured to generate said one or more first control signals and said one or more second control signals.

3. The apparatus according to claim 1, wherein said apparatus is configured as a video encoder.

4. The apparatus according to claim 1, further comprising:
a storage medium configured to store said compressed bit stream; and
a video decoder circuit configured to recover said one or more transform coefficients from said H.264-AVC FRExt High Profile compliant compressed bit stream.

5. An apparatus comprising:
a receiver circuit configured to recover a H.264-AVC FRExt High Profile compliant bitstream from a transmission medium, wherein a specification of the H.264-AVC FRExt High Profile includes language explicitly limiting residual 4×4 block coefficients to 16-bit values for 8-bit video;
a first decoder circuit configured to recover one or more coefficients from said bitstream, wherein said first decoder is configured to generate said one or more coefficients with a maximum width of sixteen bits;
a second decoder circuit configured to generate a video output in response to said one or more coefficients; and
a 16-bit data path configured to communicate said coefficients from said first decoder circuit to said second decoder circuit.

6. The apparatus according to claim 5, further comprising a 16-bit memory configured to store said one or more coefficients.

7. The apparatus according to claim 5, wherein said first decoder circuit comprises:
an entropy decoder; and
a scaler and inverse quantizer circuit.

8. The apparatus according to claim 5, further comprising an encoding circuit configured to transcode said video output.

9. The apparatus according to claim 5, wherein said second decoder circuit is further configured to perform one or more operations selected from the group consisting of inverse zigzag scanning, inverse transformation and video sample reconstruction.

10. The apparatus according to claim 5, wherein said data path is configured to perform single word 16-bit direct memory access (DMA) transfers with only one 16-bit word per coefficient.

11. A method for encoding a video stream comprising the steps of:
generating, in an encoder, one or more residual 4×4 block coefficients representing 8-bit video data in response to one or more first control signals and one or more second control signals;
limiting a bitdepth of each of said one or more residual 4×4 block coefficients to a maximum of sixteen bits; and
generating a H.264-AVC FRExt High Profile compliant bitstream in response to said one or more coefficients, wherein a specification of the H.264-AVC FRExt High Profile includes language explicitly limiting the residual 4×4 block coefficients to 16-bit values for 8-bit video.

12. A method for decoding video comprising the steps of:
recovering a H.264-AVC FRExt High Profile compliant bit stream representing 8-bit video data from a transmission medium using a decoder, wherein a specification for the H.264-AVC FRExt High Profile includes language explicitly limiting the residual 4×4 block coefficients to 16-bit values for 8-bit video;
recovering one or more coefficients from said bit stream, wherein said one or more coefficients have a maximum width of sixteen bits;
communicating said coefficients via a 16-bit data path; and
generating a video output from said decoder in response to said one or more coefficients.

13. The method according to claim 12, wherein said one or more coefficients comprise residual 4×4 block coefficients.

14. The method according to claim 12, wherein the step of recovery said one or more coefficients comprises (i) an entropy decoding operation and (ii) an inverse quantization operation.

15. The method according to claim 12, further comprising the step of:
transcoding said video output.

16. The method according to claim 12, wherein the step of generating said video output comprises performing one or more operations selected from the group consisting of inverse zigzag scanning, inverse transformation and video sample reconstruction.

17. The method according to claim 12, further comprising the step of:
storing each of said one or more coefficients in a single 16-bit memory location.

18. The method according to claim 17, wherein storing each of said one or more coefficients comprises the step of:
performing a single word 16-bit direct memory access (DMA) transfer with one 16-bit word per coefficient.

* * * * *